United States Patent
Luce

[11] 3,744,049
[45] July 3, 1973

[54] LIQUID CRYSTAL DRIVING AND SWITCHING APPARATUS UTILIZING MULTIVIBRATORS AND BIDIRECTIONAL SWITCHES

[75] Inventor: Nunzio A. Luce, Trenton, N.J.

[73] Assignee: Optel Corporation, Princeton, N.J.

[22] Filed: Nov. 16, 1971

[21] Appl. No.: 199,181

[52] U.S. Cl........ 340/336, 340/324 R, 350/160 LC
[51] Int. Cl. ............................................... G09f 9/30
[58] Field of Search................. 350/160 R, 160 LC, 350/162; 340/324 R, 324 M, 336

[56] References Cited
UNITED STATES PATENTS

| | | | |
|---|---|---|---|
| 3,575,492 | 4/1971 | Nester et al. ................. | 350/160 LC |
| 3,622,224 | 11/1971 | Wysocki et al. ............... | 350/160 LC |
| 3,653,745 | 4/1972 | Mao.............................. | 350/160 R |
| 3,505,804 | 4/1970 | Hofstein........................ | 340/336 |

*Primary Examiner*—John W. Caldwell
*Assistant Examiner*—Marshall M. Curtis
*Attorney*—Harvey W. Mortimer, Robert R. Keegan et al.

[57] ABSTRACT

A liquid crystal or other display device employing a drive and control circuit for activating selected segments of the display with a bidirectional current utilizing integrated circuit technology with a low voltage DC primary power supply to produce and control the bidirectional current. Accordingly, said DC power supply is utilized to operate a multivibrator circuit which at first and second outputs thereof provides rectangular waveforms varying alternately between a first and a second DC level to cause bidirectional current flow through the crystal when a return path is implemented through a bidirectional current conducting switch.

15 Claims, 4 Drawing Figures

3,744,049

LIQUID CRYSTAL DRIVING AND SWITCHING APPARATUS UTILIZING MULTIVIBRATORS AND BIDIRECTIONAL SWITCHES

This invention relates to liquid crystal or other displays. A typical liquid crystal display consists of a thin layer of normally transparent liquid crystal material between two parallel electrodes at least one of which is segmented. In any area of the liquid crystal material in which a low voltage electrical field is applied, the material becomes turbulent, reflecting and scattering ambient light. At least one of the electrodes and the display window are transparent thus forming a very effective display device which maintains excellent brightness and contrast under high ambient light conditions although requiring extremely low power. If desired, conventional external illumination can be provided for the display.

The present invention provides such a display having a driving and control circuit which permits the selection of high contrast liquid crystal materials with low power requirements and extremely long life while still maintaining the capability of extreme miniaturization and compatibility with a low voltage direct current primary power supply.

Liquid crystal displays are characteristically controlled by electronic computer logic circuits. For example numerical displays of the liquid crystal type commonly employ a decoder control circuit to convert a binary coded control signal to an appropriate combination of signals to activate the segments of the display to form a desired arabic numeral. It is most convenient to utilize integrated circuit computer technology for the direct control of liquid crystal displays since the current requirements of the displays are low enough to present no problem from the point of view of current demand. Such electronic computer logic circuitry almost invariably employs unidirectional current.

However, when conventional integrated circuit computer logic (or in fact other conventional computer logic) is used to directly control liquid crystal displays, one encounters a serious and heretofore unsolved problem. The most desirable liquid crystal displays from the point of view of low power requirements, good contrast and the like undergo a polarization effect when exposed for a long time to unidirectional current. Hence, a display utilizing unidirectional current and the most desirable forms of liquid crystal materials deteriorates in a short period of time, for example on the order of a thousand hours or less. On the other hand, it is known that the use of alternating current for liquid crystal displays can readily provide displays with reliable lifetimes of many tens of thousands of hours.

For some applications such as sports scoreboards or the like where miniaturization is not an objective, the displays may be rendered long-lived by operating them from a 60-cycle AC power supply and utilizing conventional AC switching techniques in conjunction with appropriate DC computer logic elements to control the switches. This is clearly not an appropriate solution for many applications, such as wristwatches and portable calculators, in which miniaturization is an important, if not the most important, requirement. Consequently, those working in this technology have engaged in a difficult search for liquid crystal material for displays which would not deteriorate rapidly when controlled by conventional unidirectional integrated circuit computer logic. That search has not been remarkably successful, and it is one object of this invention to make it unnecessary to develop unidirectional current driven liquid crystal materials which retain the capability for miniaturization, long life and high contrast which the liquid crystal display should provide.

The present invention provides a control system for liquid crystal displays totally compatible with integrated circuit electronics wherein the signals controlling and powering the display segments are bidirectional, symmetric current signals.

It is an object of the present invention to provide a liquid crystal display with a low voltage DC primary power supply wherein the display cells are not exposed to significant unidirectional current flow.

It is another object of the present invention to provide such a liquid crystal display utilizing integrated circuit technology wherein the driving and control circuitry for the display may be integrated with part or all of the logic circuitry called for by the display application.

Other objects and advantages of the apparatus will be apparent from consideration of the following description in conjunction with the appended drawings, in which.

Figure 1:
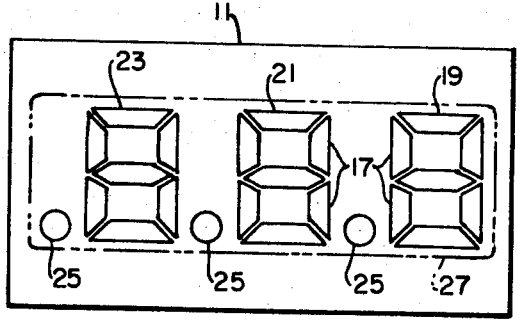
FIG. 1 is a plan view of a liquid crystal digital display in accordance with the invention.
Figure 2:
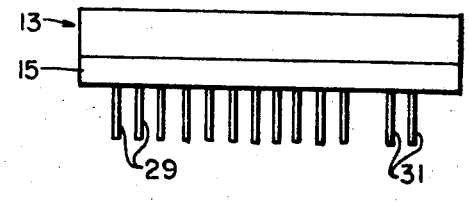
FIG. 2 is an elevational view of the apparatus of FIG. 1.

A liquid crystal reflective numeric display 11 is shown in FIG. 1. The display, when provided with a low voltage direct current primary power and conventional digital computer control signals, will display the arabic numerals corresponding to the digital control signals. As illustrated, display 11 includes three decimal digits and three controllable decimal points for the display of numbers from 0.001 through 999 with three significant figures.

Obviously, the information capability of the display can be expanded or diminished as required, and alphabetic or other information can be displayed in place of or in addition to numeric information as required. The particular unit illustrated in FIG. 1 may readily be ganged to display numerals with greater numbers of significant digits in multiples of three.

The display unit 11 comprises a display module 13 and a logic module 15. As is known, the display module 13 consists of a cell containing a thin layer of normally transparent liquid crystal material between one unitary electrode 27 and a plurality of segmentary electrodes 17. Electrode 27 is the front electrode and is transparent. When an electric field is applied between the electrode 27 and any one of the segmentary electrodes 17, the liquid crystal material therebetween becomes turbulent, reflecting and scattering ambient light. The back of the cell is preferably dark (light absorbtive) for this reflective form of display to enhance the contrast.

The segmentary electrodes 17 are arranged to form numeral units 19, 21 and 23. Circular electrodes 25 provide the controllable decimal point indicators. Suitable constructions for the display module 13 are well known, and since the particular form of the display module is not critical to the present invention, this construction will not be described in detail. Display module constructions are shown, for example, in U.S. Pats. Nos. 3,499,112, 3,499,702 and 3,540,796, and "Liquid Crystal Matrix Displays" in Proceedings of the IEEE, November 1971, Volume 59, Number 11, page 1566.

The logic circuitry for the display is preferably contained in the integrated circuit module 15 although physically separate units could obviously be employed. The module 15 is provided with a number of electrical leads including control leads 29 and power leads 31.

Figure 3:
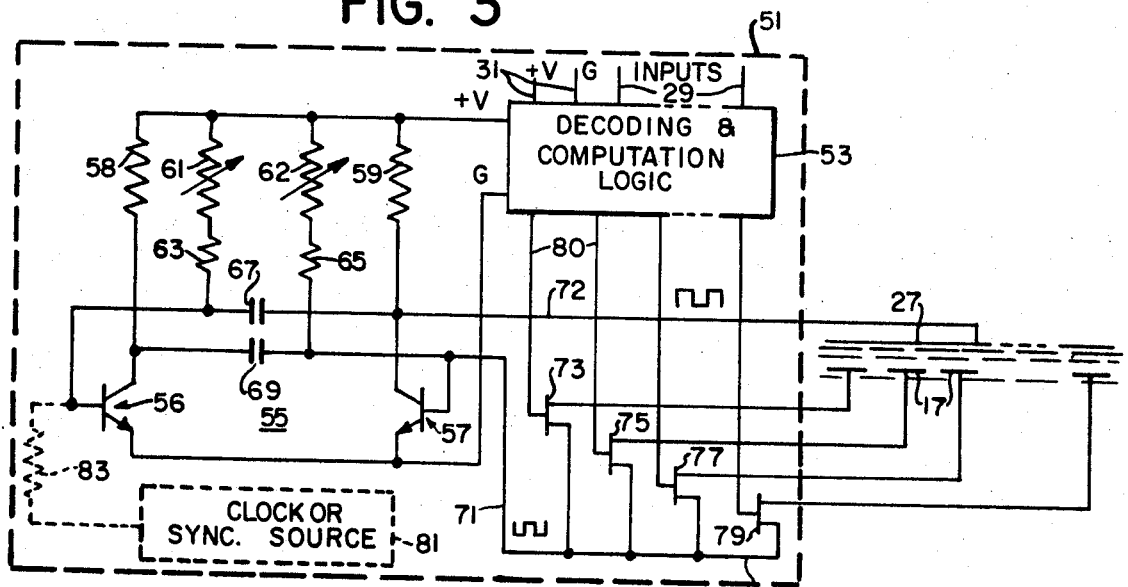
FIG. 3 is a schematic circuit diagram of one form of integrated circuit in accordance with the invention.

The integrated logic circuitry of module 15 is illustrated schematically in FIG. 3. For clarity of illustration, the display 11 is presented in a form which accepts standard binary coded decimal input signals together with decimal point locator signals and performs all necessary computation and decoding to provide a display corresponding to these input signals. It should be understood, however, that in many applications it will be found convenient to include more extensive computation logic in the display 11. For example, the computation logic may include one or more pulse counters so that the display would correspond to the number of pulses provided to an appropriate input or to some function thereof.

In an advantageous form of the invention, the decoding and computation logic and the bidirectional current generator circuit are all formed on a single integrated circuit chip. In this manner, the circuitry can be reduced in size to a fraction of a square inch, at the same time reducing the circuit power requirements to an extremely low level.

Accordingly, in FIG. 3, the integrated circuit chip is represented by a dashed enclosure 51. A portion of the chip will be occupied by decoding and computation logic 53 of conventional form. The inputs to the chip are supplied on leads 29 and 31 as previously described, with leads 31 being the primary power supply leads. As previously explained, the primary power supply may be a DC low voltage (less than 25 volts) source such as a dry cell battery. Other sources or voltages may be employed where convenient.

One portion of the integrated circuit chip, shown as the left portion in FIG. 3, is the bidirectional display driver circuit 55. Driver circuit 55 may be a free-running astable multivibrator circuit of conventional form as illustrated in FIG. 3.

Transistors 56 and 57 are the active elements of circuit 55. The operation of the circuit is such that one of the transistors 56 and 57 is "off" while the other of the transistors 56 and 57 is "on." This condition is switched at a generally constant rate determined by the circuit parameters. The circuit is relatively uncomplicated consisting of the transistors, collector resistors 58 and 59, variable base resistors 61 and 62 with fixed base resistors 63 and 65, and coupling capacitors 67 and 69.

The operation of free-running astable multivibrator circuits is well known, and adaptation of such circuits for the invention is quite simple. As previously explained, it is important for the driver circuit to operate substantially symmetrically, for example within 10 percent or preferably within 1 percent. The frequency of the multivibrator operation is not critical and may be, for example, from 5 to 1,000 hertz. Resistors 61 and 62 in the circuit are variable resistors to facilitate adjustment of the circuit although this would not be necessary if all parameters of the circuit could be precisely controlled. It will be understood that any adjustment to the driver circuit 55 is merely a production expedient and no adjustment is required during operation.

The driver circuit 55 as thus far described will operate at a frequency which is not well regulated and subject to changes of temperature, voltage or the like. If desired, and particularly if it is readily available, a clock oscillator or synchronizing source 81 may be utilized to achieve better regulation of the frequency of driver circuit 55. Such an optional clock or synchronizing source 81 is shown in dashed lines in FIG. 3 connected through an input resistor 83 to the base of transistor 56. It should be emphasized that the clock 81 is not essential as there will normally be no necessity to accurately regulate the driver circuit frequency.

It will be seen from FIG. 3 that when transistor 57 is "on," output lead 72 from circuit 55 will be near ground potential, and when transistor 57 is "off," output lead 72 will be at positive potential. The opposite situation will prevail for output lead 71.

Accordingly, leads 71 and 72 constitute a source of symmetric bidirectional current available to drive the liquid crystal reflective display 13. The waveform supplied is essentially square. Lead 72 is connected to electrode 27 of display 13, and lead 71 is connected to a bus 70 which is selectively connectable to segmented electrodes 17 of the display 13. It will be understood that the particular driver circuit 55 consisting of a free-running astable multivibrator circuit is utilized for illustration only, and that any circuit capable of being realized on an integrated circuit chip and providing the desired bidirectional symmetric current source may be utilized in accordance with the invention. Some examples of other circuits are P-channel or N-channel or complementary P and N channel devices used to construct multivibrator or other bidirectional current sources.

The flow of current from the respective segmented electrode 17 to the common electrode 27 is controlled by symmetrical semiconductor control switches schematically illustrated at 73, 75, 77 and 79. These switches are symmetrical in the sense that they will control either half of the bidirectional current driver waveform in the same manner when supplied with a given input signal from the decoding and computation logic 53. Various symmetrical integrated circuit switch devices are known, for example a P-channel and an N-channel field effect transistor with oppositely polarized inputs obtained by the use of an inverter. Alternatively, the switches 73, 75, 77 and 79 may each be a composite circuit built up from non-symmetrical switching devices in a straightforward manner, although this would require a capacitor in line 72.

Reviewing the operation of the device, particularly as schematically illustrated in FIG. 3, it will be seen that the inputs to the decoding and computation logic 53 cause certain outputs on leads 80 which, in turn, are the control signals for symmetrical semiconductor switching elements 73, 75, 77 and 79. Each of such switch elements permits current flow only when supplied with an "on" signal, thus causing the liquid crystal matrial contiguous to the associated segmented electrode 17 to be opaque in response to the "on" signal.

The current flow between the segmented electrode 17 and the common electrode 27 is bidirectional and symmetrical notwithstanding the DC primary power supplied to leads 31. The operation of the drive circuit 55 is such as to sequentially reverse the operative connection of conductors 70 and 72 (hence the segmented and common electrode) relative to the positive and negative (ground) terminals 31. This has the very important consequence of achieving very long life and high reliability for the display utilizing known liquid crystal materials characterized by intolerance to prolonged unidirectional current flow.

Note that liquid crystal displays may comprise a matrix formed by two sets of segmented electrodes in which case bidirectional current switches would control current to the electrodes of both sets.

Figure 4:
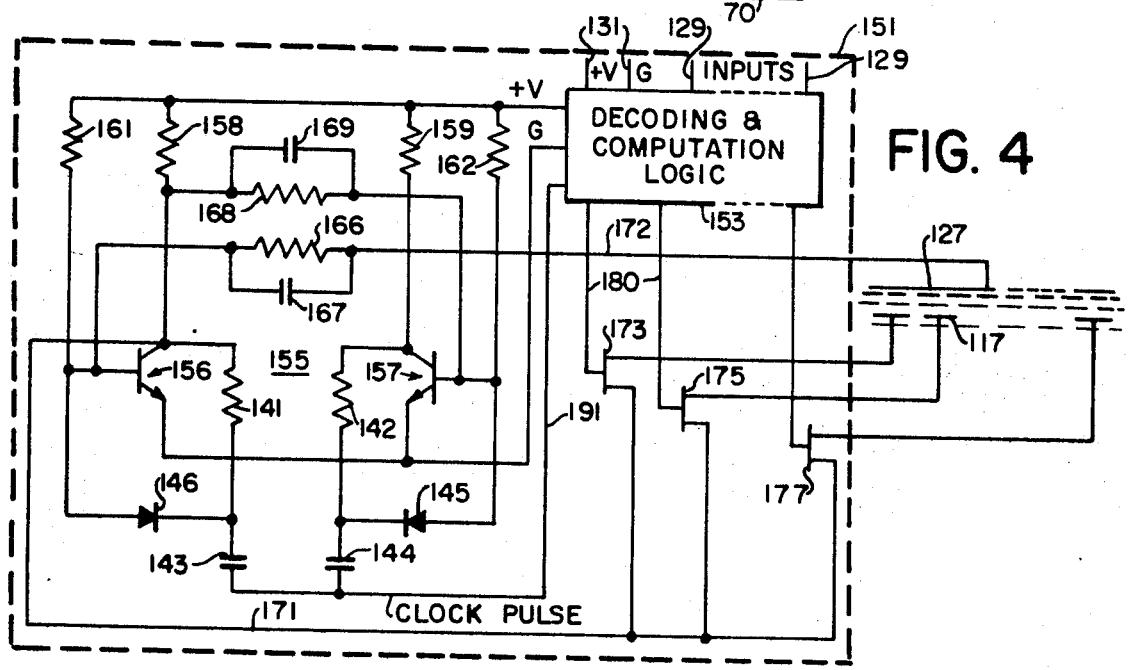
FIG. 4 is a simplified schematic circuit diagram of an alternative form of integrated circuit for controlling and driving the display in accordance with the invention.

An alternative embodiment of the invention is illustrated in FIG. 4 wherein the driver circuit is a bistable multivibrator which requires a clock pulse input.

As in FIG. 3, the circuitry is preferably instrumented on a single integrated circuit chip indicated schematically at 151. The decoding and computation logic is schematically illustrated by block 153 and is similar to that shown in FIG. 3 except that a clock pulse output 191 is available to control the driver circuit 155. Such pulse may be generated in block 153 or supplied through a lead 129. The driver circuit 155 includes a pair of transistors 156 and 157 in a symmetric circuit arrangement further including collector resistors 158 and 159, base resistors 161 and 162, and a pair of RC coupling circuits 166, 167 and 168, 169. Clock pulse lead 191 is connected through capacitor 143 and resistor 141 to the collector transistor 156, and similarly from capacitor 144 and resistor 142 to the collector of transistor 157. A diode 145 is connected from the junction of resistor 142 and capacitor 144 to the base of transistor 157, and a diode 146 is connected from the junction of resistor 141 and capacitor 143 to the base of transistor 156.

The bistable multivibrator circuit 155 operates in a known manner characterized by one of the pair of transistors 156, 157 being off while the other transistor is on. Switching from one condition to the other condition does not occur spontaneously, however, but is caused by the receipt of a clock pulse from clock pulse lead 191. The oscillation frequency of the multivibrator circuit 155 is accordingly controlled (within limits) by the frequency of the clock pulse 191. As before, this frequency is not critical and may be set within the range of approximately 5 to 1,000 hertz. Assuming that the clock pulse at lead 191 is of normal regularity, the symmetry of the oscillation of the bistable circuit 155 will be quite well within the required accuracy. Such bistable circuits may be P-channel or N-channel or complementary P and N channel devices used to construct a multivibrator or other bidirectional current source controlled by an external oscillator. The bidirectional source may also consist of two inverter circuits connected in series where the output of the first inverter is connected to line 172 and the output of the second inverter is connected to line 171 and the input to the first inverter is driven by an available symmetrical waveform.

The output from output leads 171 and 172 in FIG. 4 is substantially the same as from leads 71 and 72 in FIG. 3, and the operation of the remaining portion of the circuit of FIG. 4 is substantially as explained with reference to FIG. 3, that is, switches 173, 175 and 177 perform the same function as switches 73, 75, 77 and 79 to control the operation of the liquid crystal display electrodes 117 and 127 as was done to control the display with electrodes 17 and 27 in FIG. 3.

It should be noted that for simplification of the illustrations, less than all of the inputs 29 and 129, the switches 73, 75, etc., the electrodes 17 and 117 have been shown. It will be understood that the numbers of such elements will vary according to the particular application. There would, for example, be 24 electrodes 17 and 117 in the particular embodiment illustrated, each having an associated switch element 73, 75, etc. The number of inputs 29 would depend on the particular form of decoding and computation logic but in a typical case might number 15.

It will be appreciated that the invention is by no means limited to the particular embodiment of a three-digit numerical display or to the particular circuitry illustrated, but that the principles of the invention may be applied generally to liquid crystal displays controlled and driven by integrated circuits.

In addition to the particular embodiments of the invention described and illustrated, it will be apparent that modifications and variations thereof will be readily devised by those skilled in the art, and the scope of the invention is not limiJed to the particular embodiments shown or suggested but encompasses the expected variations and modifications that may be derived from the invention, and it is intended that the appended claims be so construed.

What is claimed is;

1. In a display wherein a display cell has discrete portions which are rendered less transparent to generate an image which is a function of a plurality of input signals, the combination comprising a cell containing a liquid crystal material, a first electrode unit in said cell, a second electrode unit consisting of a plurality of electrode segments in said cell, circuit means including a plurality of active circuit elements and including a drive current bus, a plurality of bidirectional current switches responsive to said input signals each connected in series between a respective one of said electrode segments and said drive current bus, a current conductor connected to said first electrode unit, two low voltage DC primary power terminals and a plurality of current switches in a circuit connected to reversibly establish a current connection between respective ones of said power terminals and said drive current bus and said current conductor.

2. Apparatus as claimed in claim 1 further including in said circuit means a plurality of active circuit elements forming a circuit having as inputs the control inputs for said display device and with outputs connected respectively to control said bidirectional current switches, said circuit thereby defining the functional relation between said display inputs and the image.

3. Apparatus as claimed in claim 2 further including in said circuit means at least one active circuit element in a circuit forming a clock signal generator of substantially constant frequency connected to control the reversing of connections from said power terminals to be synchronized with said clock signal.

4. Apparatus as claimed in claim 1 wherein said circuit connected to reversibly establish connection between said power terminals and said drive current bus and said current conductor causes the bidirectionality of current to be symmetrical within about 10 percent.

5. In a display device wherein a display cell has discrete portions which are rendered less transparent to generate an image which is a function of a plurality of input signals, the combination comprising a cell containing a liquid crystal material, a first electrode unit in said cell, a second electrode unit consisting of a plurality of electrode segments in said cell, and at least one integrated circuit device having a plurality of active circuit elements integrated therein and including a drive current bus, a plurality of bidirectional current switches responsive to said input signals each connected in series between a respective one of said electrode segments and said drive current bus, a current conductor connected to said first electrode unit, two low voltage DC primary power terminals and a plurality of current switches in a circuit connected to sequentially establish two different current connections from said power terminals to said drive current bus and said current conductor, the first of said connections connecting the first power terminal to said drive current bus and the second power terminal to said current conductor, the second of said connections connecting the first power terminal to said current conductor and the second power terminal to said drive current bus.

6. Apparatus as claimed in claim 5 further including in said integrated circuit device a plurality of active circuit elements forming a circuit having as inputs the control inputs for said display device and with outputs connected respectively to control said bidirectional current switches, said circuit thereby defining the functional relation between said display inputs and the reflective image.

7. Apparatus as claimed in claim 6 further including in said integrated circuit device at least one active circuit element in a circuit forming a clock signal generator of substantially constant frequency connected to control the reversing of connections from said power terminals to be synchronized with said clock signal.

8. Apparatus as claimed in claim 5 wherein said circuit connected to sequentially establish two different current connections from said power terminals sequences the connections so that their time duration is about equal.

9. In a display device wherein a display cell has discrete portions which are rendered less transparent to generate an image which is a function of a plurality of input signals, the combination comprising a cell containing a liquid crystal material, a first electrode unit in said cell, a second electrode unit consisting of a plurality of electrode segments in said cell, a drive current bus, a plurality of current switches responsive to said input signals each connected in series between a respective one of said electrode segments and said drive current bus, a current conductor connected to said first electrode unit, two DC primary power terminals, and a circuit including a plurality of current switches connected to reversibly establish a current connection between respective ones of said power terminals and said drive current bus and said current conductor.

10. In a liquid crystal display of the type including a common electrode, a plurality of electrode segments and a layer of a liquid crystal material interposed between said common electrode and said electrode segments, said layer being capable of changing its response to light upon activation by a current, the improvement therewith of apparatus for activating said liquid crystal with a bidirectional current, comprising:

a. a multivibrator circuit including first and second active devices each having a common electrode, an input electrode and an output electrode and feedback means coupling the output electrode of said first device to the input electrode of said second device and the output electrode of said second device to the input electrode of said first device, to enable said circuit to be selectively activated to any one of two states wherein the first state said first device is biased on and said second device is biased off and in a second state, said first device is biased off and said second device is biased on, b. first means coupled to at least one input electrode of said first and second active devices to selectively alternate said states at a desired rate, and c. second means for coupling one of said output electrodes of said first and second devices to said common electrode of said liquid crystal, and said other output electrode to at least one of said electrode segments to bidirectionally activate said liquid crystal according to said desired rate.

11. The apparatus according to claim 10 wherein said multivibrator circuit is a bistable multivibrator curcuit.

12. The apparatus according to claim 10 wherein said multivibrator circuit is an astable multivibrator circuit.

13. In a liquid crystal display of the type including a common electrode, a plurality of electrode segments and a layer of a liquid crystal material interposed between said common electrode and said electrode segments, said layer being capable of changing its response to light upon activation by a current, the improvement therewith of apparatus for activating said liquid crystal with a bidirectional current, comprising:

a. a multivibrator circuit having a first and second output terminal of the type providing a first given rectangular waveshape at said first output terminal of an amplitude varying between a first DC level and a second DC level which second level is relatively at reference potential, and at second output terminal providing an analagous waveform of an amplitude at said second DC level when said first waveshape is at said first level and at a said first DC level when said first waveshape is at said second DC level, and b. means coupling said first output terminal to said common electrode of said liquid crystal and said second output terminal to at least one of said electrode segments to cause a bidirectional current to flow through said liquid crystal according to said first and second waveshapes.

14. In a display of the type utilizing a liquid crystal having a common electrode, a plurality of segment electrodes and a liquid crystal material located between said common electrode and said segment electrodes, the improvement in combination therewith of apparatus for providing a bidirectional current flow through said liquid crystal to activate the same, comprising:

a. a multivibrator circuit having a first and second output terminal for providing a first waveform at said first terminal of an amplitude alternately varying between a first DC level and a second DC level, which second level is relatively at reference potential, and a second waveform at said second terminal which alternately varies opposite to said first waveform whereby when said first waveform is at said first DC level, said second waveform is at said second DC level, b. means coupling said first output terminal of said multivibrator to said common electrode of said liquid crystal, c. means including a bidirectional current switch of the type exhibiting a low impedance in a first state upon activation of said switch by a control signal, and a high impedance in a second state, said switch coupled in series between at least one of said segment electrodes and a point of reference potential, and d. control means coupled to said switch for providing said control signal to cause said switch to exhibit said low impedance state to provide a bidirectional current return for said segment electrode.

15. Apparatus for driving a display of the type including a liquid crystal having at least two electrodes and a liquid crystal material between said electrodes, said apparatus comprising:

a. first and second active devices, each having an input, output and common electrode, b. means coupling said common electrode to a point of reference potential, c. first feedback means coupling said output electrode of said first device to said control electrode of said second device, and second feedback means coupling said output electrode of said second device to said control electrode of said first device to cause said active devices to form a composite multivibrator circuit wherein alternately when one of said first and second devices is biased on, said other of said first or second devices is biased off, d. means coupling said output electrode of said first device to one of said electrodes of said liquid crystal and said output electrode of said second device to said other electrode of said liquid crystal to cause a signal to be developed across said liquid crystal according to the states of said active devices, and e. means coupled to at least one of said control electrodes of said active devices to determine the rate at which said devices are biased on and off.

* * * * *